United States Patent [19]

Porter, Sr. et al.

[11] Patent Number: 4,573,857
[45] Date of Patent: Mar. 4, 1986

[54] VEHICLE TOWING MECHANISM

[75] Inventors: Calvin R. Porter, Sr.; Calvin R. Porter, Jr., both of Kansas City, Mo.

[73] Assignee: Ready Built Tow Trucks, Inc., Kansas City, Mo.

[21] Appl. No.: 458,200

[22] Filed: Jan. 17, 1983

[51] Int. Cl.$^4$ .............................................. B60P 3/12
[52] U.S. Cl. ..................................... 414/563; 280/402
[58] Field of Search ....................... 280/402; 414/563; 52/731, 223 R

[56] References Cited

U.S. PATENT DOCUMENTS

| | | | |
|---|---|---|---|
| 1,794,148 | 2/1931 | Collins | 414/563 |
| 2,039,398 | 5/1936 | Dye | 52/223 R X |
| 2,045,793 | 6/1936 | Pearson et al. | 414/563 |
| 2,111,341 | 3/1938 | Tetrault | 414/563 |
| 3,182,829 | 5/1965 | Wagner | 414/563 |
| 3,434,607 | 3/1969 | Nelson | 414/563 |
| 3,690,482 | 9/1972 | Gaumont | 414/563 |
| 3,877,591 | 4/1975 | Howard | 414/563 |
| 3,924,763 | 12/1975 | Pigeon | 414/563 |
| 3,984,120 | 10/1976 | Boveia | 414/563 X |
| 4,034,873 | 7/1977 | Haring | 414/563 |
| 4,264,262 | 4/1981 | LoCodo | 414/563 |
| 4,384,817 | 5/1983 | Peterson | 414/563 |
| 4,434,993 | 3/1984 | Curtis | 414/563 X |
| 4,473,237 | 9/1984 | Lind | 280/402 |
| 4,473,334 | 9/1984 | Brown | 414/563 |

FOREIGN PATENT DOCUMENTS 760688  11/1956  United Kingdom ................ 414/563

OTHER PUBLICATIONS

American Wheelift Systems, "Self-Loading Wheelift," Colma, California.
"Zack-Lift," East End Motors, Inc., Cle Elum, Washington.
"Peterson Scoop," Diversified Products Mfg. Co., Jacksonville, Florida.

Primary Examiner—Robert J. Spar
Assistant Examiner—Stuart J. Millman
Attorney, Agent, or Firm—Litman, Day and McMahon

[57] ABSTRACT

A vehicle towing mechanism adapted to be utilized in conjunction with a truck for towing a wheeled vehicle. The towing mechanism includes an elongate main support member which is pivotally connected to the truck and extends rearwardly therefrom. The main support member has vertical, spaced side walls formed of a prestressed high tensile metal and is constructed to have an upwardly bowed configuration; such configuration is retained by an upper wall fixedly attached thereto. A vertical riser member is adapted to be vertically slidable relative to the truck rear end and is connected to the main support member to inhibit lateral movement. The main support member is connected to an apparatus which supports laterally spaced wheels of the vehicle and includes wheel-engaging devices for each wheel. Each device has a rotating section and a fixed section. Wheel retainers are adapted to secure the wheels within respective devices and securely lock the wheel-supporting apparatus in a selectively fixed position. A support cable is adapted to be operatively connected to a tow truck winch and to the main support member such that the vehicle towing mechanism and the vehicle to be towed are simultaneously lifted upon operation of the truck winch.

2 Claims, 8 Drawing Figures

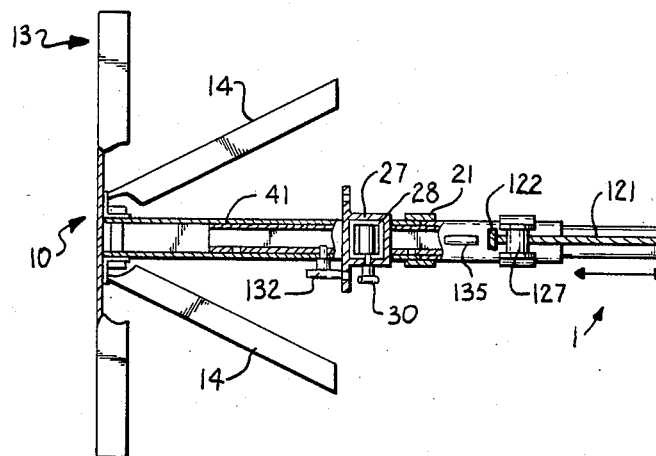
Fig. 2.
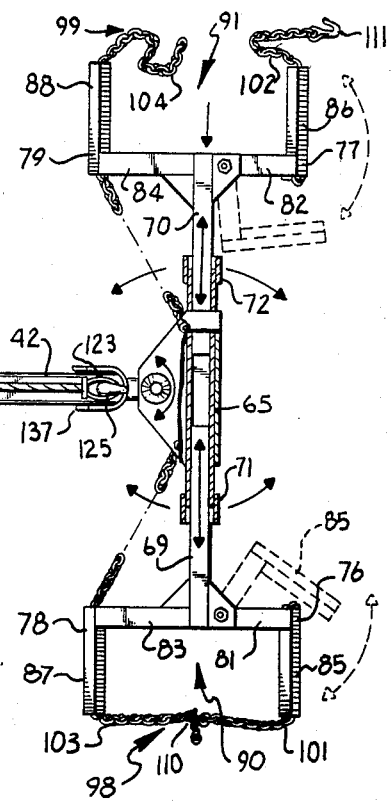
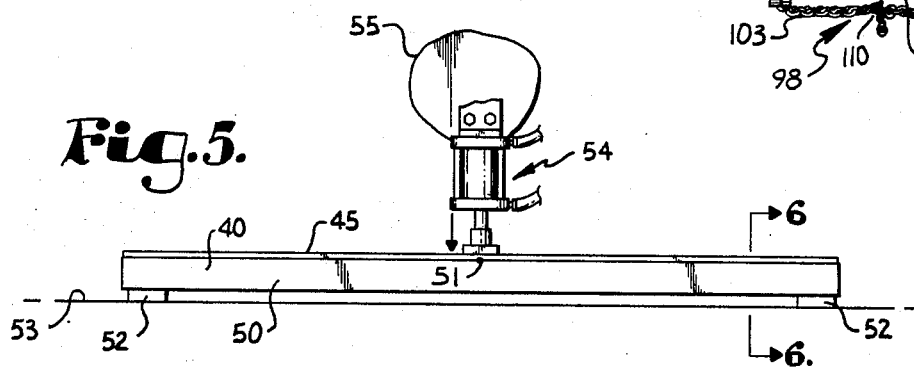
Fig. 5.
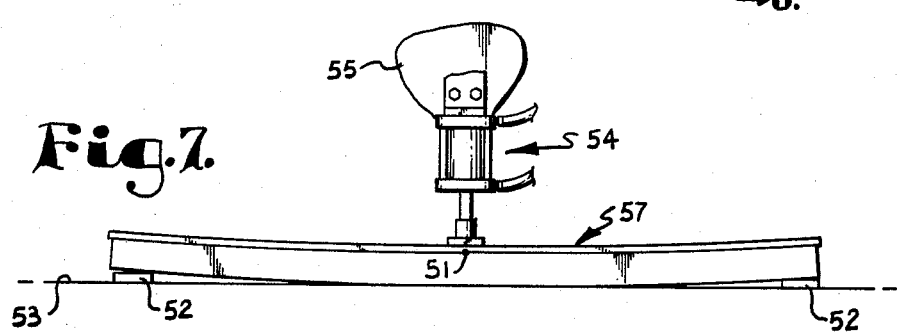
Fig. 7.
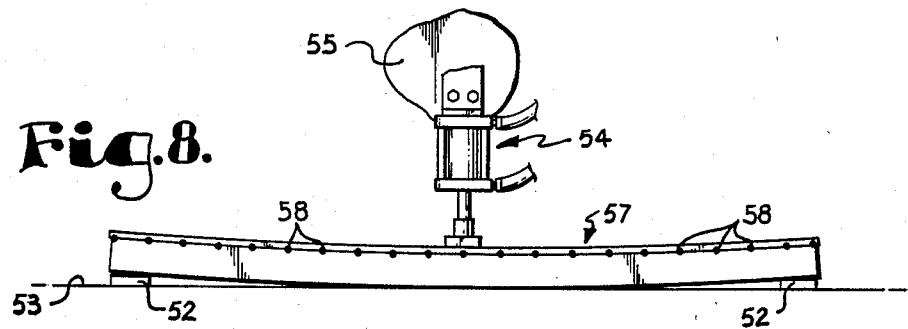
Fig. 8.

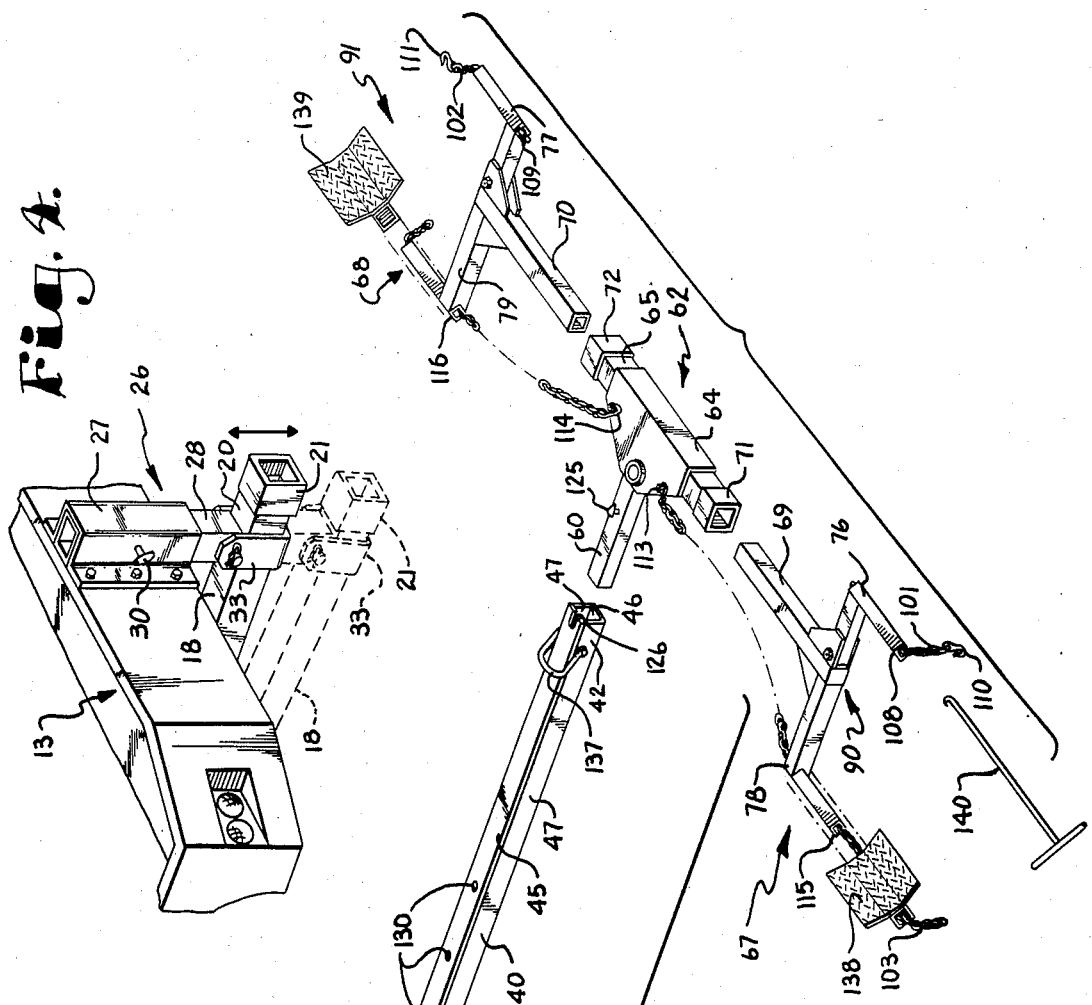
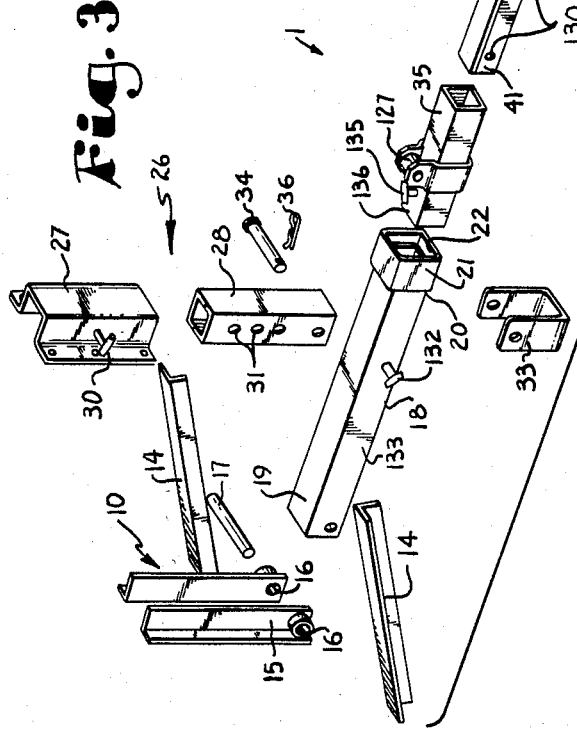

VEHICLE TOWING MECHANISM

BACKGROUND OF THE INVENTION

This invention relates to mechanisms for towing vehicles and in particular to such a mechanism utilized in towing such vehicles by engaging and lifting a set of wheels of the vehicle.

Often conventional towing devices lift and pull a vehicle by hooking a chain or sling to its bumper, axle or undercarriage. Many such conventional devices have proven to be inadequate for towing newer vehicles having lightweight metal or plastic bodies which are easily damaged when pressure is exerted thereagainst by the towing device. Various attempts have been undertaken to provide alternative towing methods.

One alternative type of device raises the car by supporting the front or rear wheels thereof off the ground with a mechanism engaging mainly only such wheels. Several of these wheel-supporting devices are known in the towing art. Some of these devices are constructed of relatively thick steel, such that the devices are relatively heavy. Such heavy weight is of concern to a tow truck operator because, if the load on the rear of his truck is too much, the front wheels of the truck will leave the ground and the truck will be inoperable or at best have poor driving control. This loading problem is accentuated when the main pivot of the unit is placed at the rear end of the truck so as to be spaced rearwardly of the rear axle and when the winch and boom of the truck are not utilized as lifting aids.

Some of the conventional towing art devices are very complicated in structure and manufacture and tend to be either bulky or unstable in design. Additional hydraulic devices are often required for the operation of the lift mechanisms associated therewith. Another problem associated with some of the devices is that they interfere with or prohibit the alternative use of conventional towing devices thereby lessening the versatility of the tow truck. Other devices are somewhat unstable, in that they are free to swing from side-to-side and present a danger of loss of control of the towed vehicle.

Thus, there exists a need for a towing mechanism which does not support or directly engage the bumper or body panels of the vehicle to be towed but rather, supports members not easily subject to damage such as wheels or the like. Further, there is a need for such a mechanism which is relatively light in weight, yet strong enough to support a towed vehicle, which takes advantage of leverage and purchase principles to ease lifting, is not complicated in design or manufacture, provides stability in towing, can be utilized in conjunction with an existing conventional towing device, and efficiently and securely engages the wheels of particular vehicles with differing wheel spacing.

OBJECTS OF THE INVENTION

The principal objects of the present invention are: to provide a mechanism for towing vehicles which does not engage easily damagable body panels or bumpers thereof; to provide such a towing mechanism which lifts the vehicle by supporting wheels or relatively hard-to-damage frame members thereof; to provide such a towing mechanism which utilizes leverage and purchase principles to facilitate lifting of the vehicle; to provide such a towing mechanism which is relatively light in weight; to provide such a towing mechanism which is sufficiently strong to support the vehicle; to provide such a towing mechanism which is not complicated in design or manufacture; to provide such a towing mechanism which provides stability in towing; to provide such a towing mechanism which is versatile and can be utilized in conjunction with an extant, conventional towing device; to provide such a towing mechanism which simply, expeditiously and securely engages the wheels of the particular vehicle to be towed; and to provide such a towing mechanism which is relatively simple to use, economical to manufacture, and particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A vehicle towing mechanism is provided for utilization in towing a vehicle. The towing mechanism is adapted for use with a truck which has winch means and, preferably, a boom. The term "truck" is used herein to refer to any vehicle or device for towing another vehicle and is not meant to be limiting to a particular type of vehicle. Although the term "winch means" is used herein, it is foreseen a number of conventional hoisting mechanisms, such as a hydraulic ram, may be utilized as the winch means. An elongate main support member of the towing mechanism is pivotally connected at a first end thereof to a rear portion of the truck, forwardly of a rear end of such truck. Preferably, the focus of the pivotal connection of the main support member to the truck is horizontally very closely spaced to the rear axle of the truck, or in front of the axle where possible, so as to reduce the lever arm between the axle and the connection. The main support member extends rearwardly from the truck and is longitudinally aligned therewith. A second end of the main support member is remote from the truck.

The main support member has an upper portion, a lower portion, and an interconnecting side portion. The side portion is vertically aligned and formed of a prestressed high tensile metallic material. Such prestressing is applied in such a manner that the side portion has an upwardly bowed configuration within a vertical plane such that the side portion curves slightly upwardly from a longitudinal center to respective ends thereof. The upper and lower portions are fixedly attached to respective upper and lower edges of the side portion. The upper portion is attached to the side portion after bowing and functions to retain the side portion, and the entire main support member, in the bowed position.

A vertical riser member is slidably connected to the truck's rear end. The riser member has a clevis extending downwardly therefrom, through which the main support member passes. The riser member is selectively positionable to accommodate the pivotal position of the main support member. Lateral movement of the main support member is limited by the riser member, but operational vertical pivotal movement of the main support member is not so limited.

The towing mechanism further includes a wheel-supporting apparatus having a linking member, a pair of wheel-engaging devices and wheel-retention means. The linking member is swingably connected at a central portion therealong to the main support member second end and has or position relative to the main support member wherein the linking member extends generally transversely thereto. The wheel-engaging devices have arm members which are telescopically receivable upon opposite outer ends of the linking member.

Connected to each of the arm members are respective wheel-engaging rotating and fixed sections. Each of the rotating sections swing in a generally horizontal plane toward and away from a wheel-receiving region defined and bounded by the respective fixed and rotating sections of each arm member when the rotating sections are swung to a wheel-holding position relative to the fixed sections. The towing mechanism, and specifically the respective fixed sections thereof, is brought into operative contact with the wheels when the rotating sections are in an open or wheel-receiving position relative to the respective sections. In particular, wheel engagement is expedited when the rotating sections are swung away, as this allows the towing mechanism fixed sections to be backed into abutment against the wheel without being hindered by the rotating sections. When the fixed sections are in an abutment position against the wheels, the rotating sections are swung toward the wheels and engage them.

Preferably, before the fixed section is locked into abutment with the vehicle wheels, the arm members are adjusted by sliding thereof along the linking member such that the fixed sections will be generally centered relative to the respective wheel same will eventually engage.

Wheel-retention means, such as flexible straps, chains or the like, are provided to selectively retain the wheel-engaging devices in operative contact with the wheels and to securely lock the wheel-supporting apparatus in place. The wheel-retention means also preferably lock the arm members in a position relative to the linking member such that the arm members cannot telescope further outward therealong.

A lift mechanism is provided for lifting the remainder of the towing mechanism, as well as the wheels of the vehicle to be towed. The lift mechanism includes a support cable which is connected at one end to the tow truck winch means and at another end to the main support member near the second end thereof. The cable extends through sheave means connected to the main support member forwardly of the second end. The location of the sheave means is such that the cable extends generally vertically downward from the winch means to the sheave means and then generally horizontally to the second end of the main support member. This configuration provides clearance for the body of the towed vehicle so that the cable does not hinder engagement of the vehicle wheels and allows the towing mechanism and vehicle wheels to be raised upon actuation of the lift mechanism. The cable puts opposed tension on opposite ends of the main support member, which tension increases with increased weight being applied thereto, as when the vehicle is raised, so as to maintain the bowed configuration of the main support member.

The drawings constitute a part of this specification and include exemplary embodiments of the present invention and illustrate various objects and features thereof.

BRIEF DESCRIPTION OF THE DRAWINGS

FIG. 2 is a top plan view in reduced scale of the towing mechanism attached to the truck with portions broken away to show detail and with parts thereof shown in phantom lines to illustrate articulation.

FIG. 3 is an exploded view in reduced scale of the towing mechanism.

FIG. 4 is a fragmentary perspective view in slightly reduced scale of the towing mechanism attached to the truck.

FIG. 5 is a side elevational view of a main support member of the towing mechanism in an early step in the process of fabrication shown with a ram.

FIG. 6 is an enlarged cross-sectional view of the main support member taken along line 6—6 of FIG. 5.

FIG. 7 is a side elevational view of the main support member similar to FIG. 6 but in a later step in the process of fabrication wherein the main support member is in a bowed position.

FIG. 8 is a side elevational view of the main support member similar to FIG. 7 but in a still later step in the process of fabrication wherein a top wall thereof is fixedly attached to the remainder of the main support member by welding.

Figure 1:
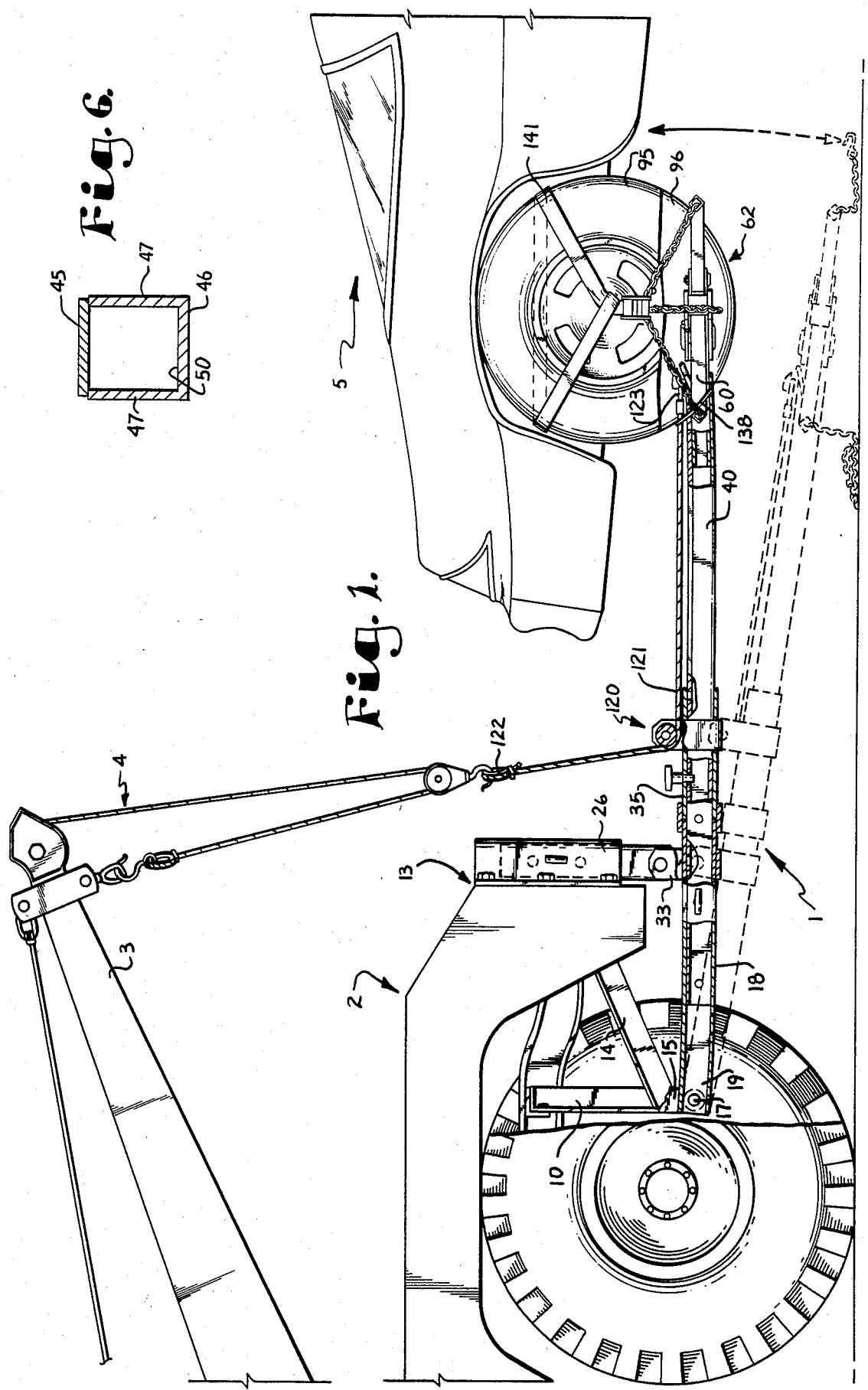
FIG. 1 is a side elevational view of the a vehicle towing mechanism according to the present invention shown attached to a truck with portions broken away to show detail and with the towing mechanism shown in solid lines in a lifting position and in phantom lines a lowered position prior to engagement of the vehicle.

It is noted that certain features of the drawings are exaggerated to better show detail thereof.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a vehicle towing mechanism embodying the present invention. The towing mechanism 1 is secured to a truck 2, the illustrated truck 2 having a boom 3 and winch means 4, for towing a vehicle 5.

As used herein, the term "forward" means in the direction from the right to the left of the page with respect to the view of the towing mechanism 1 shown in FIG. 1 (i.e. toward the truck 2 from the vehicle 5), and the term "rearward" has the opposite meaning. The terms "upper", "lower" and other common derivatives thereof have the same meaning as shown in the drawings.

A mounting device 10 is fixedly attached to the truck 2 substantially forward of a rear end 13 thereof and depends generally vertically therefrom. The mounting device 10 has stabilizing means, such as a pair of struts 14, for limiting movement of the mounting device 10 attached thereto. The struts 14 extend upwardly, rearwardly and laterally from near a bottom end 15 of the mounting device 10 to the truck rear end 13.

The towing mechanism 1 is pivotally connected to the mounting member bottom end 15 and extends rearwardly from and is generally longitudinally aligned with the truck 2. The illustrated towing mechanism 1 includes a tubular proximate support member 18 having a first end 19 which makes the pivotal connection with the mounting member bottom end 15, and having a rearward and opposite end 20. The mounting member bottom end 15 has aligned apertures 16. The proximate support member first end 19 has aligned apertures 23 which align with the mounting member apertures 16 when the proximate support member 18 is connected to the mounting member 10. A pivot pin 17 is inserted through the apertures 16 and 23 to provide a point about which the towing mechanism 1 may be pivoted. As illustrated, the pivot pin 17 is fixedly secured to the mounting member 10, as by welding, thus allowing the towing mechanism 1 to pivot about a fixed point. The opposite end 20 has an enlarged lip 21 which defines an opening into an interior cavity 22 and snugly fits about the remainder of the proximate support member 18.

A riser member 26 is connected to the truck rear end 13 and engages the proximate support member 18. The riser member 26 comprises a first riser tube 27 and a second riser tube 28. Specifically, the first riser tube 27 is fixedly attached to the truck rear end 13 and is generally vertically aligned. The second riser tube 28 is telescopically received relative to the first riser tube 27 so as to slide relative to one another along a vertical axis. The second riser tube 28 is selectively held in place in alternative vertical positions relative to the first riser tube 27 by a retractable pin 30 which extends through the first riser tube 27 and is selectively received in one of a plurality of apertures 31 in the second riser tube 28 so as to interfere with movement therebetween.

The riser member 26 is provided with means to surround or capture and engage the proximate support member 18, such as the illustrated clevis 33 which surrounds the proximate support member 18 at a point forward of the enlarged lip 21. The clevis 33 is pivotally connected to the second riser tube 28 by a clevis pin 34. The clevis pin 34 extends through apertures in the clevis 33 and second riser tube 28 and is retained by a cotter pin 36. The clevis 33 acts to limit lateral movement of the towing mechanism 1 as the riser member 26 is secured or fixed to the truck rear end 13 to prevent lateral movement therebetween, thereby adding stability to the towing mechanism 1. However, the proximate support member 18 is not restricted by the riser member 26 in its vertical pivotal movement within a selected range of movement, although the riser member clevis 33 serves as a safety feature to support the towing mechanism 1 if other support devices fail (discussed below).

A sleeve member 35 is received relative to the proximate support member enlarged lip 21 within the lip interior 22. The details and purposes of the sleeve member 35 will become apparent as the illustrated embodiment is further described below.

An elongate main support member 40 is telescopically received relative to the sleeve member 35 and the proximate support member 18. The main support member 40 has a support or first end 41 and a free end 42; the support end 41 is illustrated as received into the sleeve member 35 and the proximate support member 18. Further, as illustrated, the main support member is tubular and has a top portion or wall 45 and a bottom portion or wall 46 interconnected by spaced generally parallel side portions or walls 47.

The main support member 40 is formed of a metallic material, such as a high tensile alloy steel. The bottom wall 46 and side walls 47 are welded into a U-shaped channel 50, as shown in FIG. 6. The top wall 45 is placed on top of the channel 50 and is slightly narrower than the bottom wall 46 thereof. The top wall 45 is tack welded to the channel 50 on either side and near the middle of the channel 50, indicated by number 51 in FIG. 5, so as to position the top wall 45 relative to the remainder of the channel 50 while the latter is being "prestressed".

Such prestressing is preferably achieved by the method of placing ends of the channel 50 (with top wall 45 tacked thereto, as in FIG. 5) on blocks 52 supported by a floor 53, further as shown in FIG. 5. A hydraulic ram 54 attached to an appropriate fixed structure, such as wall structure 55 is located above the block-supported channel 50 and top wall 45. The hydraulic ram 54 is actuated downwardly into contact with the top wall 45 and forces the channel 50 and top wall 45 into a bowed configuration as indicated by the numeral 57 and as is illustrated in FIGS. 7 and 8, in which the main support member 40 curves upwardly from a longitudinal center thereof to the opposite ends 41, 42. For example, the blocks 52 may be approximately ¾ inch high and the main support member 40 about 6 feet long and the main support member 40 is thereby bowed a corresponding amount. With the main support member 40 in the hydraulically bowed position, the top wall 45 is tack welded to the channel 50 at a multiplicity of points along the entire length thereof as indicated by the numeral 58 and as seen in FIG. 8 and then fully welded thereto. The top wall is seen to extend slightly over the ends 41 and 42 of the main support member 40 in FIG. 8, even though both were the same length prior to bowing. The welding of the top wall 45 to the channel 50 after prestressing or bowing is believed to function to retain the main support member 40 in the bowed position.

In particular, while applicant does not intend to be held to a particular theory of how the bowing functions to increase the strength of the main support member 40, it is believed that the following principles apply to the prestressed main support member 40. As mentioned, the main support member 40 is preferably formed of a high tensile alloy steel which can be deformed to a substantial degree without rupturing or becoming permanently deformed. That is, a steel is desired which can withstand a relatively high amount of stress and still be at least partly elastic. Because the channel 50 is being subjected to stresses which deform same only elastically or at least only partly, the channel 50 will not, by itself, retain the bowed position 57 once the hydraulic ram 54 is removed, especially when a load is placed thereon such as when lifting a vehicle.

Further, it is believed the top wall 45 serves as a restraint to retain the entire main support member 40 in the bowed configuration indicated by the numeral 57. The initial tack weld keeps the top wall 45 in place during the stress or bowing operation. Because it is not fixedly attached to the channel 50 along its entire length during the bowing step, the top wall 50 is not subjected to the same stresses as the channel and is subject to elongation relative thereto, as shown in FIG. 8. The top wall 45 is then welded to the channel 50 when the channel 50 is in the bowed configuration indicated by the numeral 57 and the top wall 45 is elongated. As the hydraulic ram 54 is removed, the channel 50 is naturally urged to elastically regain its former shape. However, with the top wall 45 attached, the shear stresses between the top wall 45 and channel 50 act to retain the main support member 40 in the bowed position.

It is also believed that this prestressing of the main support member 40 results in a stronger unit, enabling lighter weight steel to be used. The conventional practice has been to use one-half inch thick steel to produce similar support tubes; the present process allows ¼ inch thick steel to be used instead. This results in a significant relative reduction in total weight of the towing mechanism 1, thereby lessening problems associated with overloading the rear of the truck 2.

Applicant has found that a suitable steel for use in fabrication of the main support member 40 is a steel commonly sold under the tradename "National Steel GLX 45,000". This alloy, produced by National Steel Corporation, has the following general composition (in addition to iron): Carbon (0.130%); Manganese (0.530%); Phosphorous (0.009%); Sulfur (0.031%); Copper (0.050%); Silicon (0.050%); Columbium (0.018%) (percentages are percent by weight with remainder being iron). Yield strength of this alloy steel is approximately 49,730 pounds per square inch; tensile strength is approximately 62,670 pounds per square inch, with a 21.8% elongation over 8 inches. It is understood that other similar steels would be suitable for the intended purpose.

Due to the bowed configuration of the main support member 40, both the sleeve member 35 and the proximate support member 18 are preferably also bowed, in corresponding relation to the bowing of that portion of the main support member 40 which is respectively received therein.

A wheel-supporting apparatus 62 is swingably connected to the main support member 40 by a pivotal adapter 60 which is bowed slightly to be telescopically received relative to the main support member second end 42. The pivotal adapter 60 is connected to a clevis-type connector 64 which allows rotation of the apparatus 62 in a generally horizontal plane about the connector 64 when the pivotal adapter 60 is horizontally aligned. The wheel-supporting apparatus 62 further includes a linking member, such as a crossbar 65, which is centrally attached to the connector 64 and extends outwardly from the pivotal adapter 60. The linking member has a normal towing position wherein same is generally transversely aligned relative to the pivotal adapter 60 and the main support member 40 but can rotate about the connector 64 when the truck 2 turns a corner or the like.

First and second wheel-engaging devices 67 and 68 having respective transverse arm members 69 and 70 are telescopically received relative to respective outer ends 71 and 72 of the crossbar 65. The wheel-engaging devices 67 and 68 have respective rotatable sections 76 and 77, and respective fixed sections 78 and 79 attached respectively to the first and second arm members 69 and 70.

The rotatable sections 76 and 77 are swingable in a generally horizontal plane when the main support member 40 is horizontally aligned. The rotatable and fixed sections 76,77 and 78,79 each have a longitudinal component 81, 82, 83 and 84 respectively, and a transverse component 85, 86, 87 and 88. The respective rotatable and fixed sections 76,77 and 78,79 define respective first and second wheel-receiving spaces 90,91 bounded by the respective rotatable and fixed transverse components 85,86 and 87,88 when the rotatable sections 76,77 are positioned such that the transverse components 85,87 and 86,88 are generally parallel and the respective longitudinal components 81,83 and 82, 84 are substantially coaxial. When the first transverse components 85 and 87 are parallel and the second transverse components 86 and 88 are parallel, they each are in a position such that when raised they will snugly abut and be generally parallel with a tread surface of a tire of a wheel received within the wheel-supporting apparatus 62 while the first longitudinal components 81 and 83 and the second longitudinal components 82 and 84 engage the side wall of such wheels respectively. Thus, the rotatable sections 76 and 77 are swingable into and away from their respective wheel-engaging positions. It is noted that each of the sections 76, 77, 78 and 79 are generally L-shaped in configuration.

The fixed longitudinal components 83,84 extend forwardly of the transverse crossbar 65 and toward the truck 2, while the rotatable longitudinal components 81,82 extend rearwardly of the transverse crossbar 65 and away from the truck 2. This orientation tends to expedite wheel engagement because, when the rotatable sections 76 and 77 are swung away from the wheel-engaging positions thereof, the towing mechanism 1 is easily moved under the vehicle 5 to be towed until the fixed transverse components 87,88 abut against respective vehicle wheels 95, 96 as seen in FIG. 11.

Wheel-retention means are provided for retaining the wheels 95, 96 in respective wheel-receiving spaces 90,91 and for locking the telescoping transverse arm members 69 and 70 in relation to the crossbar 65. In particular, in the illustrated embodiment, first and second chain units 98, 99 are utilized as the wheel-retention means. Each unit has a respective elongate and flexible hooking section 101, 102 and a respective elongate and flexible extension section 103,104. The hooking sections 101,102 are connected to respective rotatable transverse components 85, 86 and extend through bores 108,109 therein formed by square box beams used in the construction of such components. The hooking sections 101,102 extend from the rotatable longitudinal components 85,86 a distance. The hooking sections 101,102 are equipped with respective hooks 110,111. The extension sections 103,104 are attached to the wheel-supporting apparatus 62 at respective locations inward of the wheel-engaging devices 67,68, preferably to the connector 64 at positions noted by numerals 113 and 114 respectively. The extension sections 103,104 are fixedly attached to components 78,79 respectively and extend through bores 115,116 in respective fixed transverse components 78,79 and further extend therefrom a substantial distance so that the extension sections 103,104 are long enough to be securely coupled to retain and support the wheels 95,96 of the vehicle 5 to be towed when the sections 76 and 77 are in the wheel-engaging position thereof. Although chains are used for the wheel-retention means, it is foreseen that other suitable devices such as cable or the like may be utilized.

The wheel-retention means function in cooperation with the fixed spacing of the wheels of a vehicle to lock the position of the transverse arm members 69 and 70 relative to the crossbar 65. In particular, when a vehicle, such as a car 5, is supported by the wheel-supporting apparatus 62, the chain units 98 and 99, when snugly locked, surround the wheels 95 and 96 and prevent the transverse arm members 69 and 70 respectively from telescoping outwardly with respect to the crossbar 65, while the constant spacing of wheels 95 and 96 prevents the transverse arm members 69 and 70 from collapsing inwardly with respect to the crossbar 65.

A lift mechanism 120 is included for connecting to the truck winch means 4 to lift the towing mechanism 1 and the vehicle wheels 95,96. A lift mechanism support cable 121 is operatively connected at one end 122 to a cable of the winch means 4 and at another end 123 to connector means such as an illustrated support peg 125 on the pivotal adapter 60. The peg 125 is received in a notch 126 in the main support member second end 42 when the towing mechanism 1 is assembled. When tension is applied to the cable 121 by the winch means 4, the cable 121 applies a frontward directed force to the peg 125 so as to urge the shank member 60 to be snugly and fixedly held in the main support member 40. In this manner, a positive connection between the main and shank members 40 and 60 is provided. Sheave means, such as free roller 127, are attached to the sleeve member 35, and the cable 121 is journaled therethrough as it extends from the winch means 4 to the peg 125. The roller 127 is aligned to allow the cable 121 to be tensioned with minimal friction. The cable 121 extends generally vertically from the winch means 4 to the peg 125 along and in close proximity to the main support member 40 so that the vehicle 5 to be towed may be lifted without interfering with the operation of the lift mechanism 120. The roller 127 is positioned relatively near the front end of the main support member 40, such that when tension is applied to the cable 121, as when lifting or transporting the vehicle 5, the cable 121 exerts a force on opposite ends of the main support member 40 on the topside thereof so as to function to urge the main support member 40 to remain in the bowed position thereof.

Various safety features are provided in addition to the riser member 26, discussed above. The main support member 40 has two sets of apertures 130 and 131 through one of the side walls 47 and through the top wall 45, respectively, as seen in FIG. 3. The proximate support member 18 has a retractable pin 132 which is extendable through a sidewall and into an interior thereof. The pin is positioned to be selectively receivable through one of the apertures 130 in the main support member side wall 47, to retain the main support member 40 in place relative to the proximate support member 18 should the cable 121 break or otherwise fail during a towing operation.

The top wall apertures 131 correspond in relative position to another retractable pin 135 which is extendable through a top wall 136 of the sleeve member 35 and acts to keep the sleeve member 35 in place relative to the main support member 40 while allowing the main support member 40 to be telescoped in and out relative to the proximate support member 18. The main support member second end 42 has a U-shaped member 136 swingably attached thereto on an upper surface so as to rotate about an axis transversely aligned relative to the main support member 40. The U-shaped member 136 may be flipped over the peg 125 during towing operation to retain the wheel-supporting apparatus 62 locked to the main support member 40 in event of a cable breakage or other failure.

Also, the fixed transverse sections 87,88 have wheel plates 138,139 which slide thereon to better support the wheels 95,96. A hooked rod 140 is provided to aid in telescoping or properly aligning the wheel-engaging devices 67,68 when same are under a vehicle prior to towing and threading the chains 103 and 104 through the sections 77 and 78. Wheel straps 141 are used to hold the wheels 95,96 more securely. The wheel straps 141 wrap about an upper part of the wheel and are then secured to the chains 103 and 104.

It is noted that the proximate support member 18, the sleeve member 35, and the pivotal adapter 60 are not individually necessary for the proper operation of the towing mechanism 1 and that all could be combined into a single support member unit. Rather, these are provided to ease assembly of the towing mechanism 1 and the main support member 40 could be utilized to serve the functions performed by these other members 18, 35 and 60. However, the various apertures 130 allow selective positioning of the wheel-supporting apparatus 62 relatively closer or further from the truck 2 to accommodate various lengths of vehicles with a wider separation needed for vehicles which are relatively longer between the axle to be connected and the end of the vehicle.

In use, the towing mechanism 1 is lowered such that the supporting apparatus 62 is touching or in close proximity to the ground surrounding the vehicle 5 by releasing tension on the cable 121 and adjusting the riser member 26 to the lowest position associated therewith where the pin 30 is positioned in the uppermost aperture 31. The rotatable sections 76,77 are swung away from the wheel-receiving spaces 90,91 and both the transverse arm members 69 and 70 and the tire plates 138 and 139 are aligned to be approximately in front of but spaced from respective wheels 95 and 96 or spaced slightly inward therefrom. The truck 2 is then backed up toward the vehicle 5 so that the towing mechanism 1 is partially beneath the vehicle 5 and the fixed transverse components 87,88 are in abutment against the wheels 95,96. The hooked rod 140 is used to fine position the wheel-engaging devices 67,68 relative to the wheels 95,96 so that the fixed longitudinal components 83,84 abut thereagainst. Then the hooked rod 140 is used to swing the rotating sections 76,77 toward the respective wheel-receiving spaces 90,91 and into abutment against the wheels 95,96. When the rotating sections 76,77 and fixed sections 78,79 have received the wheels 95,96, the wheel-engaging devices 67 and 68 are in a position for lifting the vehicle 5.

The normal position of the rotating sections 76,77 during the wheel-engagement procedure is such that the rotating sections 76,77 are on the side of a hypothetical line defined by extending an inner edge of the fixed longitudinal components 83,84 opposite to the wheels 95,96, that is inward or toward the center of the apparatus 62. This inward position allows the fixed sections 78,79 to be brought into wheel contact without interference from the rotating sections 76,77. It is noted that, if the wheel-engaging devices 67,68 are completely telescoped inwardly, then the rotating sections 76,77 may not need to be swung inward or need to be swung only a short distance away from the wheel-receiving spaces 90,91 to effect wheel engagement. With the wheel-engaging devices 67,68 so telescoped inwardly, the wheel-supporting apparatus 62 may be positioned under the vehicle 5 and, subsequently, the engaging devices may be telescoped outwardly to engage the wheels 95,96. However, it is preferable to telescopically position the devices 67,68 so they will align with the wheels and thereby simplify the wheel-engaging procedure since the operator only has to back the truck 2 until the wheels 95,96 abut against the fixed sections 78,79 respectively.

The pressure of the wheels 95 and 96 against the respective transverse components 85,87 and 86,88 will typically maintain the rotating sections 76,77 in operative contact therewith. The rotating sections 76,77 will not rotate away from the wheel-receiving spaces 90,91 because the rotating longitudinal components 81,82 are securely abutted against the wheels 95,96. The chain units 98,99 are snugly hooked, as are the wheel straps 141, to securely couple the wheel-supporting apparatus 62.

The main support member 40 should be telescopically positioned prior to the coupling of the wheel-supporting apparatus 62 so that the vertical portion of the cable 121 is as close to the vehicle 5 as is operationally feasible while still allowing clearance to turn and the like. This positions the vehicle 5 closer to the truck 2 and reduces movement of the load and reduces the chance that the truck's front wheels will leave the ground.

After coupling, the winch means 4 is actuated and the cable 121 is tensioned or made taut. As more force is applied to the cable 121, the lifting apparatus 62 is swung upwardly about the pivotal connection of the main support member with the truck 2 and the set of wheels 95,96 associated therewith is raised off the ground. Another set of vehicle wheels (not shown) remains on the ground. The towing mechanism is preferably positioned either horizontally or slightly above the horizontal in a position allowing the riser tube pin 30 to be inserted into an appropriate middle or lower aperture 31 as a safety precaution, as the vehicle 5 is actually supported mainly by the cable 121. The vehicle 5 is now ready for towing.

Each of the various major elements of the towing mechanism 1 serves a number of different functions. The riser member 26, for example, serves as a vertical sliding guide for the main support member 40. While allowing for vertical movement of the remainder of the towing mechanism 1 and, in particular, rotation in a vertical transverse plane about the pivot pin 17, the riser member 26 still generally inhibits lateral movement thereof and thereby provides stability to the towing mechanism 1. The second riser tube 28 is selectively lockable in various positions relative to the first riser tube 27 corresponding to movement of the towing mechanism 1. The retractable pin 30 serves as a safety pin to support the towing mechanism 1 in the event of a cable failure.

The main support member 40, due to its special construction, is strong enough to support a vehicle 5 yet is much lighter in weight than conventional devices. A support cable 121 is used to both lift the towing mechanism 1 and the vehicle 5 and to help to maintain the bowed configuration of the main support member 40 that is, the more weight lifted by the lifting and support apparatus 62 the more tension that is placed on the cable 121 to bow the main support member 40. The support cable 121 also serves to secure the support apparatus 62 relative to the main support member 40 and ensure the retention of the main support member 40 relative to the proximate support member 18.

The wheel-engaging devices 67 and 68, with their rotating sections 76,77, facilitate the capture of the vehicle wheels 95,96. The wheel-supporting apparatus 62 adjusts to the lateral spacing of the vehicle wheels 95,96 by utilizing telescoping arm members 69,70 with the crossbar 65. The wheel-engaging devices 67,68 automatically adjust to the diameter of the vehicle wheels 95,96 and securely engage them.

The chain units 98,99 complete the surrounding of the vehicle wheels 95,96 and lock the telescoped position of the arm members 69,70. The chain units 98,99 also securely maintain the operative position of the wheel-engaging devices 67,68.

The towing mechanism 1 is easily assembled and disassembled in a matter of minutes. The wheel-engaging devices 67,68 slide from the crossbar 65 (the extension chain units 103,104 slide through respective bores 115,116 and fall free thereof). The pivotal adapter 60 with crossbar 65 slides from the main support member 40 after the U-shaped member 137 and cable 121, with tension released and somewhat slack, are disengaged. The proximate support pin 132 and sleeve pin 135 are retracted and the main support member 40 and sleeve member 35 may be removed from the proximate support member 18. The winch end 122 of the cable 121 is removed. These various members may then be placed in the truck 2 leaving a relatively clean exterior on the rear of the truck 2 such that other towing devices may be easily used. The proximate support member 18 and riser member 26 are designed to remain attached to the truck 2, as they do not interfere with other truck operations. To assemble the process is reversed.

It is to be understood that while certain forms of the present invention have been illustrated and described herein, it is not to be limited to the specific forms or arrangement of parts described and shown.

What is claimed and desired to be secured by Letters Patent is as follows:

1. A vehicle towing mechanism in combination with a truck having winch means for towing a vehicle; said vehicle towing mechanism comprising:
   (a) a proximate support member pivotally connected to said truck forward of a rear portion of said truck and extending rearwardly therefrom and longitudinally therewith;
   (b) a first riser tube attached to said truck rear portion;
   (c) a second riser tube telescopically received relative to said first riser tube so as to telescope along a generally vertical axis; said second riser tube having a clevis attached thereto and surrounding and supporting said proximate support member;
   (d) means for selectively vertically locking said second riser tube in a telescoping position relative to said first riser tube;
   (e) a sleeve member telescopically received relative to said proximate support member;
   (f) an elongate main support member having a first end and a second end; said first end being telescopically received relative to said sleeve member and said proximate support member; said main support member including:
      (1) an upper wall, a lower wall and spaced side walls interconnecting said upper and lower walls;
      (2) said side walls being vertically aligned and formed of a high tensile steel and prestressed into a bowed configuration having an upward curvature in a vertical plane from a longitudinal center thereof toward said first and second ends thereof, respectively;
      (3) said lower wall being fixedly attached to said side walls near a bottom thereof; and
      (4) said upper wall being fixedly attached to said side walls near a top thereof after said side walls have been prestressed whereby said upper wall acts to retain said prestressed side walls in said bowed configuration;

(g) a wheel-supporting apparatus adapted for securely engaging and supporting a set of wheels of the vehicle to be towed, said wheel-supporting apparatus including:
  (1) a pivotal adapter telescopically received relative to said main support member second end;
  (2) a crossbar having first and second ends and a center section; said crossbar center section being swingably connected to said pivotal adapter and extending generally transversely therefrom to allow rotation of said wheel-supporting apparatus in a generally horizontal plane when said main support member is horizontally aligned;
  (3) first and second transverse arm members telescopically received relative to said first and second crossbar ends respectively;
  (4) first and second wheel-engaging devices connected to respective first and second arm members; each of said wheel-engaging devices having a rotating section and a fixed section; said fixed and rotating sections each having a longitudinal component and a transverse component;
  (5) said wheel-engaging devices having a first position in which said rotating section transverse components are spaced from and generally parallel to respective fixed section transverse components and said longitudinal components are generally coaxial; said wheel-engaging devices when in said first position thereof defining wheel-receiving spaces;
  (6) each of said wheel-engaging devices having a second position in which said rotating sections are rotated away from said wheel-receiving space such that a respective rotating section transverse component is positioned inwardly of a line projected through an inner edge of said fixed section longitudinal component;
  (7) wheel-retention means comprising first and second chain units each including a hooking section and an extension section; each of said hooking sections being connected to a respective rotating section transverse component; each of said extension sections being attached to said crossbar center section and extending through a longitudinal bore in a respective fixed section transverse component and being adapted to respectively engage said chain hooking sections; and
(h) a lift mechanism including:
  (1) a support cable having a first end and a second end; said cable first end being operatively connected to said tow truck winch means;
  (2) a support peg attached to and extending upwardly from said pivotal adapter;
  (3) sheave means attached to said sleeve member for guiding said support cable;
  (4) said support cable extending through said sheave means and being connected to said support peg at said support cable second end, whereby the vehicle towing mechanism is lifted upon operation of the tow truck winch means.

2. A vehicle towing mechanism in combination with a truck having winch means for towing a vehicle; said vehicle towing mechanism comprising:
(a) a proximate support member pivotally connected to said truck forward of a rear portion of said truck near a rear axle of said truck and extending rearwardly therefrom and longitudinally therewith;
(b) a first riser tube attached to a rear end of said truck;
(c) a second riser tube telescopically received relative to said first riser tube so as to telescope along a generally vertical axis; said second riser tube having a clevis attached thereto, said clevis surrounding and supporting said proximate support member;
(d) means for selectively vertically locking said second riser tube in a telescoping position relative to said first riser tube;
(e) a sleeve member telescopically received relative to said proximate support member;
(f) an elongate main support member having a first end and a second end; said first end being telescopically received relative to said sleeve member and said proximate support member;
(g) a wheel-supporting apparatus adapted for securely engaging and supporting a set of wheels of the vehicle to be towed, said wheel-supporting apparatus including:
  (1) a pivotal adapter telescopically received relative to said main support member second end;
  (2) a crossbar having first and second ends and a center section; said crossbar center section being swingably connected to said pivotal adapter and extending generally transversely therefrom to allow rotation of said wheel-supporting apparatus in a generally horizontal plane when said main support member is horizontally aligned;
  (3) first and second transverse arm members telescopically received relative to said first and second crossbar ends respectively;
  (4) first and second wheel-engaging devices connected to respective first and second arm members; each of said wheel-engaging devices having a rotating section and a fixed section; said fixed and rotating sections each having a longitudinal component and a transverse component;
  (5) said wheel-engaging devices having a first position in which said rotating section transverse components are spaced from and generally parallel to respective fixed section transverse components and said longitudinal components are generally coaxial; said wheel-engaging devices when in said first position thereof defining wheel-receiving spaces;
  (6) each of said wheel-engaging devices having a second position in which said rotating sections are rotated away from said wheel-receiving space such that a respective rotating section transverse component is positioned inwardly of a line projected through an inner edge of said fixed section longitudinal component;
  (7) wheel-retention means comprising first and second chain units each including a hooking section and an extension section; each of said hooking sections being connected to a respective rotating section transverse component; each of said extension sections being attached to said crossbar center section and extending through a longitudinal bore in a respective fixed section transverse component and being adapted to respectively engage said chain hooking section; and
  (8) a lift mechanism including:

(1) a support cable having a first end and a second end; said cable first end being operatively connected to said tow truck winch means;
(2) a support peg attached to and extending upwardly from said pivotal adapter;
(3) sheave means attached to said sleeve member for guiding said support cable; and
(4) said support cable extending through said sheave means and being connected to said support peg at said support cable second end; whereby the vehicle towing mechanism is lifted upon operation of the tow truck winch means.

* * * * *